May 11, 1965     D. J. DOYLE ET AL     3,182,894
COMBINED BUSINESS FORM AND ENVELOPE
Filed June 20, 1963     2 Sheets-Sheet 1

INVENTORS
DONALD J. DOYLE
JAMES W. KEHOE
BY
WATTS & FISHER
ATTORNEYS

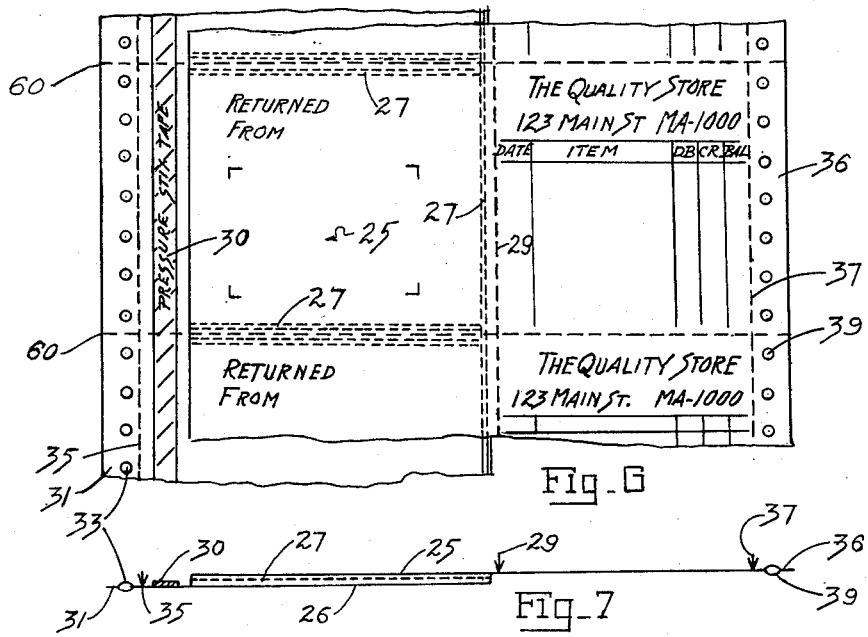
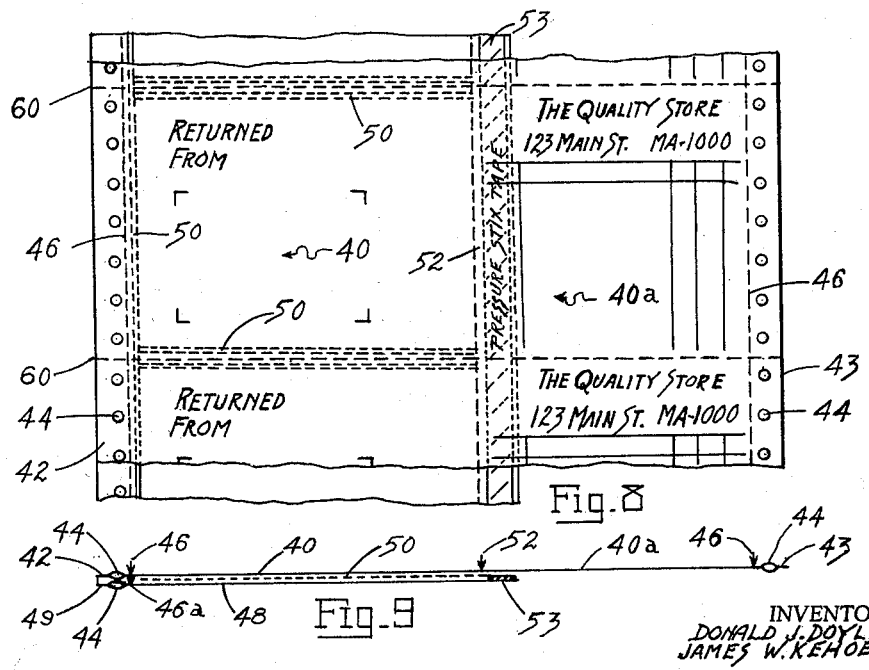

ND ENVELOPE
3,182,894
COMBINED BUSINESS FORM AND ENVELOPE
Donald J. Doyle and James W. Kehoe, Shelby, Ohio, assignors to Shelby Business Forms, Inc.
Filed June 20, 1963, Ser. No. 289,197
3 Claims. (Cl. 229—92.7)

This invention relates to the stationery art and is particularly concerned with a combined business form and envelope.

Formerly it was customary for business houses, for example stores, to send out statements of account but not to enclose an envelope for the remittance. More recently, envelopes have been enclosed. While collections are improved by enclosing envelopes, that procedure was not completely successful for the envelopes were often misplaced and were not available when the customer was in the mood to pay the bill. Several proposals have been made further to simplify and expedite the payment of bills. Several of these proposals have involved the use of a combined business form and an envelope in which the check could be placed and mailed. Certain of the proposed devices required the customer to perform several operations and, hence, tended to make more work and to afford more opportunity for mistake than no envelope at all. So far as we know, no completely satisfactory combined business form and envelope has been devised prior to the present invention.

The present invention aims to avoid the prior efforts and failures and to furnish a fully satisfactory device, and attains that object by providing an article which has a part to serve as a business form, for example a statement of account, which part can be detached at the time payment is being made and which also has a part which serves as an envelope into which the check may be placed and which can be sealed by simply folding over an adhesive carrying flap. Since the envelope is an integral part of the business form or a statement of account, it cannot be misplaced and is always at hand when a check is written in payment of the account, and since only two simple acts are needed to close the envelope, less work is required and no more chance of error exists than if the customer furnished the envelope.

The present invention will be better understood by those skilled in the art from the following specification taken with the accompanying drawings, in which:

FIGS. 6 and 7 are plan and side elevational views of a modified form of the invention; and, FIGS. 8 and 9 are top plan and side elevational views of another modified form of the invention.

Figure 1:
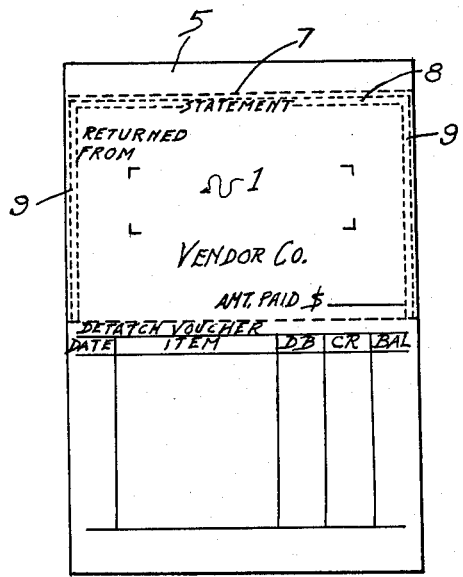
FIG. 1 is a fragmentary plan view of one form of article embodying the present invention.
Figure 2:
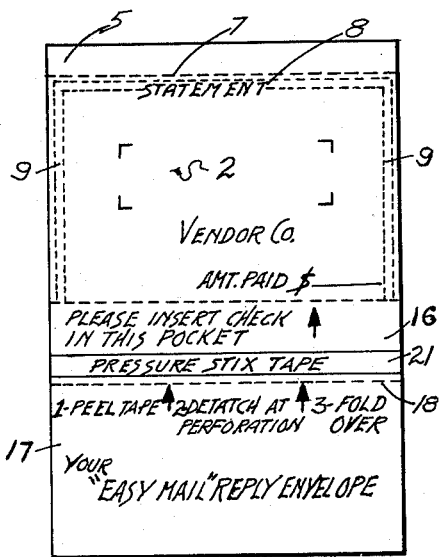
FIG. 2 is a view similar to FIG. 1 but showing the article after removal of the free end portion of the upper sheet.
Figure 5:
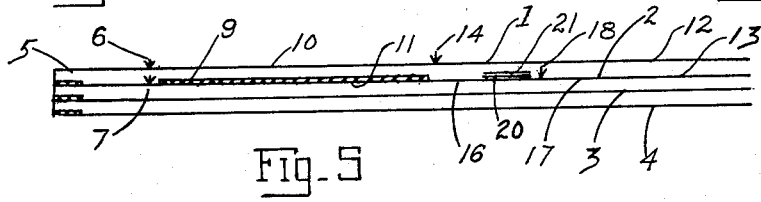
FIG. 5 is a side edge view of the article of FIG. 1 with the several sheets spaced apart for clarity.
Figure 3:
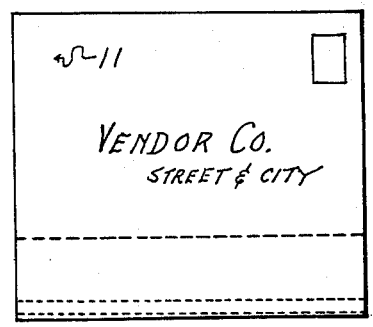
FIG. 3 is a plan view of the lower side of the lower sheet of the article of FIGS. 1 and 2 with the envelope closed by the folding over of the flap part of the lower sheet and sealing it to the connected part of the upper sheet.
Figure 4:
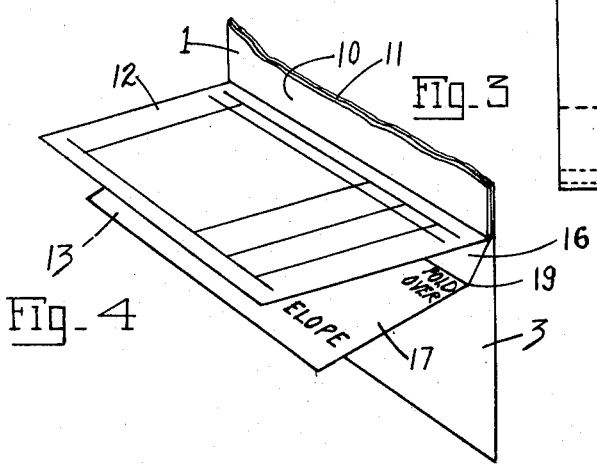
FIG. 4 is a fragmentary perspective view showing the free end portions of the upper and lower sheets of the article of FIGS. 1 to 3, as well as the end portions of carbon and copy sheets below the lower sheet.

FIGS. 1 to 3 show an article embodying the present invention and consisting of an upper sheet 1, a lower sheet 2 and one or more transfer sheets 3 and copy sheets 4 beneath the lower sheet 2. The ends of these several sheets of paper are connected together in end tabs 5 by adhesive. The tabs of sheets 1 and 2 are made readily detachable from the sheets by rows of perforations 6 and 7.

The upper sheet 1 and lower sheet 2 are connected together along one end, as indicated at 8, and along their sides for part of their length, as indicated at 9, by any suitable adhesive disposed between the two sheets. Thus, end portions 10 and 11 of the upper and lower sheets 1 and 2 are connected together on three sides and open on the fourth side so as to form a pocket into which a check may later be placed. The other end portions 12 and 13 of the upper and lower sheets 1 and 2 are free, that is, they are not connected together. The connected end portion 10 of upper sheet 1 carries on its face notations indicating that it is a business form of a certain company, for example a statement of account, with the name and address of the customer, the name of the company and the amount of the bill. The underside of the connected end portion 11 of the lower sheet 2 carries the name and address of the company to which the sealed envelope is to be returned.

The free end 12 of the upper sheet 1 carries any desired business information, for example the details of the account. This portion is to be detached by the customer and is readily detachable from the connected end portion 10 by reason of a row of perforations 14 extending across the sheet adjacent to the ends of the row of side sealing adhesive 9.

The free end portion 13 of the lower sheet 2 comprises an envelope flap portion 16 and an instruction portion 17 which is to be detached by the customer and is readily detachable from flap portion 16 by reason of a row of perforations 18 extending across the free end portion at a sufficient distance away from the ends of the adhesive 9 to permit the flap to be folded over the open side of the envelope far enough to cover the company name thereof. Flap 16 of the lower sheet is provided with a line of adhesive 20 adjacent to the row of perforations 18 for sealing the flap against the upper sheet and this line of adhesive is covered with protective means, for example an adhesive tape 21, which is to be removed by the customer when the envelope is to be sealed.

The illustrated article may be used in the following manner. Assuming that the user of the article of FIG. 1 is a store, the first sheet 1 will be supplied with the customer's name and address above the name of the store and the amount to be paid and, after removal of any additional transfer or copy sheets 3 and 4, is mailed to the customer. Such removal is made simple by reason of the fact that these carbon and copy sheets are connected only at their extreme ends, as by tabs 5. When the customer is about to pay the bill, the free end portion 12 will be detached, and a check for the amount to be paid will be inserted into the pocket between the connected portions of sheets 1 and 2. Then, part 17 of the free end portion of sheet 2 will be detached along the line of perforations 18, the adhesive protecting tape 21 will be removed and the flap 16 will be folded over the open end of the pocket and caused to adhere to the connected end 10 of the upper sheet 1. Thus, the pocket will be closed and the envelope will be completely sealed with the return address of the customer showing on one side and the customer's name and address appearing on the other side of the envelope. A stamp may be attached or sheet 2 may be provided with marks indicating that postage has been paid.

The article shown in FIGS. 1 to 5 may be made from endless strips of paper by means of conventional machines. Rolls of paper which are to constitute sheets 1 and 2 and as many transfer sheets as are desired are mounted separately on horizontal axes and then the sheets are moved endwise while various operations are being performed thereon, the sheets eventually being brought together to form the article of these figures. The actual operations so performed and their sequence of performance are as follows: (1) Printing is applied to first and second sheets and to the other sheets if desired; (2) the perforations such as 6, 7, and 14 are formed in sheets 1 and 2; (3) adhesive 8 and 9 is applied to the back of sheet 1; (4) adhesive 20 is applied to sheet 1 and is covered with protective tape 21; (5) the first, second and carbon sheets are brought together in vertically stacked positions; and, (6) the assembled sheets are cut transversely to separate the articles from one another.

It will be understood that N.C.R. transfer paper may be used in place of the carbon paper of the article of FIGS. 1 to 5. Furthermore, the carbon or N.C.R. paper and the copy sheets may be omitted, if desired, and the instruction portion 17 of the free end part of sheet 2 may also be omitted, if desired.

The modified form of the invention shown in FIGS. 6 and 7 is suitable for producing a plurality of combined business forms and envelopes from continuous sheets of paper. A part of top sheet 25 overlies lower sheet 26 and the two sheets are connected together by adhesive 27 which defines three sides of a rectangle and includes two lines running transversely of the long sheets and a third line of adhesive 27 extending lengthwise of the sheets adjacent to a line of perforations 29 near the middle of sheet 25. Along one edge of the lower sheet 26 is positioned a strip of tape 30 which will adhere to paper under pressure and the edge portion or tab 31 of the sheet 26 outside of tape 30 is provided with a row of holes 33 for engagement with propelling pins on the roll of a propelling device. The tab 31 is detachable from sheet 26 by reason of the line of perforations 35 which extend between the tab and the outer edge of tape 30. The top sheet 27 has a tab 36 detachably therefrom along a line of perforations 37 and the tab is provided with holes 39 to engage with pins by which the sheet may be propelled endwise. It is to be understood that driving pins simultaneously engage holes 33 and 39 when the top sheet is moved endwise.

The portion of the top sheet 25 which lies between perforations 29 and 37 may be provided with invoice data and is to be detached when the customer is ready to place a check in the pocket provided between sheets 25 and 26. After the check has been inserted in that pocket, the open side of the pocket, which is adjacent to tape 30, is closed by folding the part of the lower sheet 26 which carries tape 30 over the open side of the pocket and causing the tape to adhere to the upper side of sheet 25.

It will be noted that the printing on the top sheet 25 runs transversely of the endless strip of paper and, hence, that typing may be applied to the invoice sheet by suitable machines as the endless sheet passes therethrough.

The embodiment of the invention shown in FIGS. 8 and 9 is substantially the same as that shown in FIGS. 6 and 7, the main difference being in the location of the adhesive tape which, in the case of FIGS. 8 and 9, extends along the edge of the lower sheet approximately midway between the side edges of the upper sheet.

In FIGS. 8 and 9 the upper sheet is indicated at 40 with a tab 42 at one edge and a tab 43 at the other edge. Each of these tabs is provided with holes 44 to engage pins on machines by which the sheet may be propelled endwise and each tab is detachable by means of a line of perforations 46. The lower sheet 48 has an edge tab 49 beneath the adjacent tab 42 and provided with pin engaging holes 44. This lower tab 49 is detachable from the body of sheet 48 along a row of perforations 46a.

One end of upper sheet 40 is connected to lower sheet 48 by adhesive disposed along three sides of a rectangle as indicated at 50. Upper sheet 40 has a line of perforations 52 adjacent to the end of the line of adhesive 50, that is, along the open side of the pocket formed by those lines of adhesive, and part 40a of top sheet 40 may be detached along the line of perforations 52. This part 40a may carry invoice data to the customer. Lower sheet 48 extends laterally beyond perforation lines 52 and carries an adhesive tape 53 which, after the lower sheet is folded over the upper sheet, will adhere to the upper surface of sheet 40 and close the open side of the envelope.

As will be readily understood, from what has been said above, the embodiments of the invention shown in FIGS. 6 and 8 may be made with endless strips of paper and supplied with printed matter and typing as the strips are moved endwise. Thereafter, the forms may be separated from each other along transverse lines 60 in FIGS. 6 and 8 and, after removal of the tabs 31 and 36 of FIG. 6 and 42 and 43 of FIG. 8, may be placed in an envelope and sent to the customer. As in the case of the modification of FIG. 6, the customer detaches portion 40a of FIG. 8 when he is ready to pay the bill, inserts a check into the open side of the envelope and folds over the lower sheet and causes the tape 53 to adhere to the upper side of the upper sheet.

It will be understood that in each of the above described modifications, the grain of the paper runs lengthwise of the continuous strips of paper, that is, across the individual forms. When the forms are supplied with printed and typewritten matter, after being formed in an endless strip and separated from one another, the printing and typewritten matter may read across the form as in FIGS. 1 and 2, but when the printed and/or typewritten matter is supplied before the forms are detached from the continuous lengths, the printing and typing will read lengthwise of the form as in FIGS. 6 and 8.

The articles of FIGS. 6 and 7 and those of FIGS. 8 and 9 may be produced by the procedure described above with respect to the articles of FIGS. 1 to 5.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A combined business form and enveolpe comprising: upper and lower sheets having primary and secondary portions, said upper sheet having perforations between its primary and secondary portions to permit removal of said secondary portion, longitudinal and transverse lines of adhesive connecting the primary portions of both sheets to form a rectangular pocket having an open side, the secondary portion of said lower sheet including a flap foldable over the open side of said pocket, and adhesive on said flap to attach it to the primary portion of said upper sheet and thereby seal the pocket.

2. The combination of elements set forth in claim 1 in which the lower sheet has a row of perforations adjacent to said adhesive to form a portion detachable before sealing.

3. The combination of elements set forth in claim 1 in which a plurality of said combined business forms are detachably connected together in an endless strip.

References Cited by the Examiner

UNITED STATES PATENTS

| | | | |
|---|---|---|---|
| 460,472 | 9/91 | Hitt | 229—69 |
| 846,988 | 3/07 | Farmer | 229—92.7 |
| 893,202 | 7/08 | Shaw | 229—92.1 |
| 2,985,464 | 5/61 | McFarland | 229—92.3 |
| 3,026,018 | 3/62 | Stratton et al. | 229—69 |

FRANKLIN T. GARRETT, *Primary Examiner.*